United States Patent
Kwok et al.

(10) Patent No.: US 6,784,955 B2
(45) Date of Patent: Aug. 31, 2004

(54) OPTICALLY OPTIMIZED PERMANENTLY BISTABLE TWISTED NEMATIC LIQUID CRYSTAL DISPLAYS

(75) Inventors: Hoi-Sing Kwok, Clear Water Bay (HK); Jian-Xin Guo, Changchun (CN)

(73) Assignee: The Hong Kong University of Science and Technology, Kowloon (KR)

(*) Notice: Subject to any disclaimer, the term of this patent is extended or adjusted under 35 U.S.C. 154(b) by 0 days.

(21) Appl. No.: 09/966,968

(22) Filed: Oct. 1, 2001

(65) Prior Publication Data

US 2003/0076455 A1 Apr. 24, 2003

(51) Int. Cl.[7] .............................................. G02F 1/1335
(52) U.S. Cl. ...................... 349/99; 349/179; 349/180; 349/186
(58) Field of Search ......................... 349/99, 179, 180, 349/FOR 140, 76, 186, 174

(56) References Cited

U.S. PATENT DOCUMENTS

| | | | | |
|---|---|---|---|---|
| 4,896,947 A | * | 1/1990 | Leenhouts | 349/99 |
| 4,995,704 A | * | 2/1991 | Yamamoto et al. | 349/119 |
| 5,702,640 A | * | 12/1997 | Junge et al. | 252/299.1 |
| 5,764,316 A | * | 6/1998 | Takizawa et al. | 349/1 |
| 5,767,936 A | * | 6/1998 | Sugimura | 349/116 |
| 5,870,164 A | * | 2/1999 | Lu et al. | 349/180 |
| 6,056,894 A | * | 5/2000 | Hirschmann et al. | 252/299.63 |
| 6,072,558 A | * | 6/2000 | Tanaka et al. | 349/179 |
| 6,351,299 B2 | * | 2/2002 | Takiguchi et al. | 349/121 |

FOREIGN PATENT DOCUMENTS

JP    02051125 A  *  2/1990  .......... G02F/1/133

* cited by examiner

Primary Examiner—Tom Thomas
Assistant Examiner—Paul E Brock, II
(74) Attorney, Agent, or Firm—Burns, Doane, Swecker & Mathis, L.L.P.

(57) ABSTRACT

The structure and construction of a bistable twisted nematic liquid crystal display with very long lifetime are disclosed. The two stable twist states in this display when no voltage is applied have almost infinite lifetimes and do not decay. These two stable twist states differ by a twist angle of 180°. New design conditions of this bistable twist structure are disclosed such that the contrast and the brightness are both optimized. This display can be operated in transmittive mode with two polarizes or in the reflective mode with one polarizer.

4 Claims, 6 Drawing Sheets

OPTICALLY OPTIMIZED PERMANENTLY BISTABLE TWISTED NEMATIC LIQUID CRYSTAL DISPLAYS

FIELD OF THE INVENTION

The present invention relates to the design of a permanently bistable twisted nematic liquid crystal display, and in particular to such a display has two stable twist states with no applied voltage. The display can be switched between these two stable states by the application of special voltage pulses. Due to this bistability, no power is needed to maintain the display, once it is formed.

BACKGROUND OF THE INVENTION

There are many types of bistable liquid crystal displays (LCD). Among them, the bistable twisted nematic (BTN) LCD has one of the best optical properties with good contrast and brightness. This display relies on adjusting judiciously the cell thickness to liquid crystal pitch (d/p) ratio to produce the metastable twist states.

Bistable twisted nematic (BTN) liquid crystal displays (LCD) have been around since the early discovery by Berreman et al (D. W. Berreman and W. R. Heffner, *Appl. Phys. Lett.*37, 109 (1980)). In the early prior art, the bistable twist states are 0 and 360° twist respectively. Recently, Kwok et al (full reference) extended these BTN to the general case of $\phi$ and $\phi+2\pi$, where $\phi$ can be optimized to yield better optical properties such as contrast and on-state brightness.

In this latter BTN, $\phi$ can be optimized to produce excellent optical properties. However, the major problem of this BTN is that the $\phi$ and $\phi+2\pi$ twist states are metastable with short lifetimes. Indeed, the intermediate $\phi+\pi$ twist state is more stable and both the $\phi$ and $\phi+2\pi$ states will decay to it in a matter of seconds.

There are several variations of the basic BTN. Hoke et al (C. D. Hoke and P. J. Bos, *Soc. Info. Disp. Symp. Digest*, 29, 854 (1998)) use a polymer wall trying to stabilize this BTN. The results are not satisfactory as the two twist states are still short-lived. Bryan-Brown et al (GB9521106.6) demonstrated a grating aligned bistable nematic display that can be switched by sub-millisecond pulses and has infinite time memory. The display has been produced and disclosed. Its practicality is in doubt because of the need of a special surface structure in the construction of the display. Switching from one state to the other is also not easy.

Dozov et al (I. Dozov, M. Nobili and G. Durand, *Appl. Phys. Lett.* 70, 1179 (1997)) investigated a surface-controlled bistable nematic display using simple planar monostable anchoring. A high pretilt angle and a small cell gap are necessary to produce the bistability and switching between the 0 and $\pi$ twist states. This display is permanently stable in that the 0 and $\pi$ states do not decay to any intermediate states. It is similar to the $\phi$ and $\phi+2\pi$ BTN.

SUMMARY OF THE INVENTION

According to the present invention there are disclosed designs of permanently bistable twisted nematic liquid crystal displays with optimized optical properties. The stable twist states differ by an angle of $\pi$, or 180°. They are denoted $\phi$ and $\phi+\pi$. The aligment of the $\phi$ and $\phi+\pi$ twists are given by the rubbing condition that favors the $\phi$ twist. The d/p ratio is adjusted to favor the $\phi+\pi/2$ twist. This enables both the $\phi$ and $\phi+\pi$ twist states to be stable. The d/p ratio favored $\phi+\pi/2$ twist state is not stable under the given rubbing conditions. Hence the lifetimes of the $\phi$ and $\phi+\pi$ states are infinite.

The switching between the $\phi$ and $\phi+\pi$ twist states are effected through many techniques, such as having a small cell gap, or having a three electrode structure. One possible example of switching uses a triode structure. However, it is not essential to the present invention and other schemes are possible.

The new BTN can either be transmittive requiring two polarizers, or reflective requiring just one polarizer. In general, the optical properties depend on $\alpha$ and $\gamma$, which are the input and output polarizer angles, with respect to the input director of the liquid crystal cell, and the twist angles $\phi_1$ and $\phi_2$ of the two bistable twist states. The optical properties also depend on d, the liquid crystal cell thickness and $\Delta n$ is the birefringence of the liquid crystal material used. With all these values defined, the optical properties and construction of the liquid crystal display is uniquely defined. A perfect optimization procedure is given to give the exact values of the construction of the BTN to give the best optical properties.

It is also possible to construct the BTN in the reflective mode with just one top polarizer. In this case, there is no output polarizer and the display is easier to construct and more economical to make. We also will give the construction parameters for such reflective BTN to obtain the best optical properties. An important aspect of the invention is that the bistable twist states differ by an angle of 180°. rather than 360° as in the previous cases.

BRIEF DESCRIPTION OF THE DRAWINGS

Some embodiments of the invention will now be described by way of example and with reference to the accompanying drawings, in which:—

DETAILED DESCRIPTION OF PREFERRED EMBODIMENTS

Figure 1:
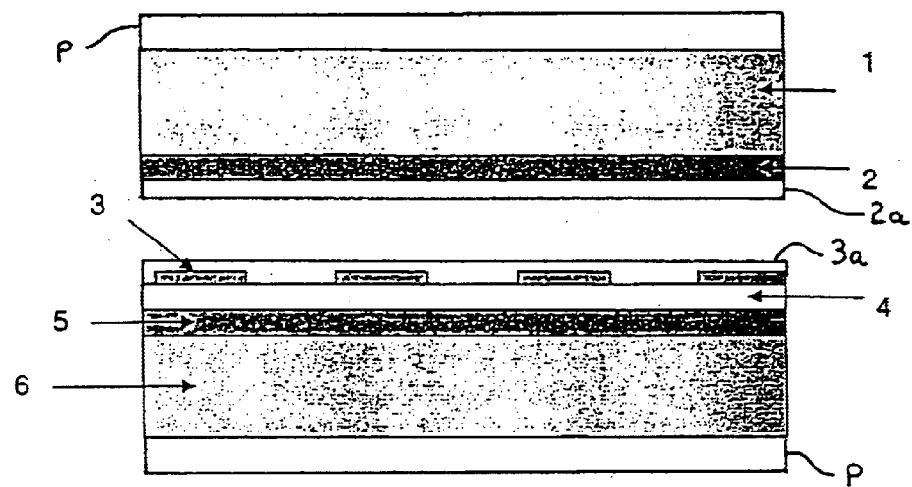
FIG. 1 shows the structure of a transmittive BTN according to an embodiment of the invention.

A first preferred embodiment of the present invention is shown in FIG. 1. This embodiment is in transmittive mode. The BTN LCD consists of two pieces of glass 1 and 6 forming a liquid crystal cell. On the top glass 1, a transparent conductive coating of indium tin oxide (ITO) 2 is deposited, followed by the polyimide alignment layer. The ITO layer 2 is patterned into strips for the purpose of dot matrix addresing.

Figure 2:
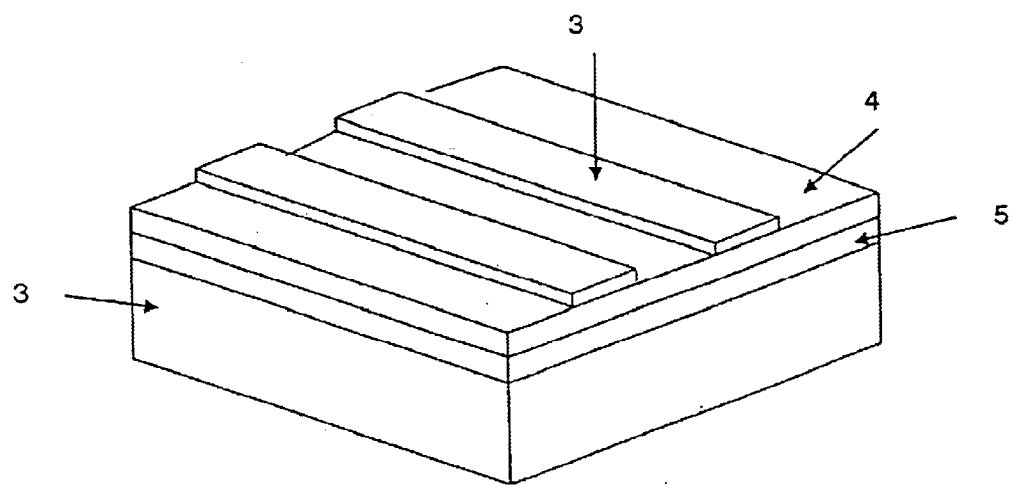
FIG. 2 shows the shape of the comb electrodes.
Figure 3:
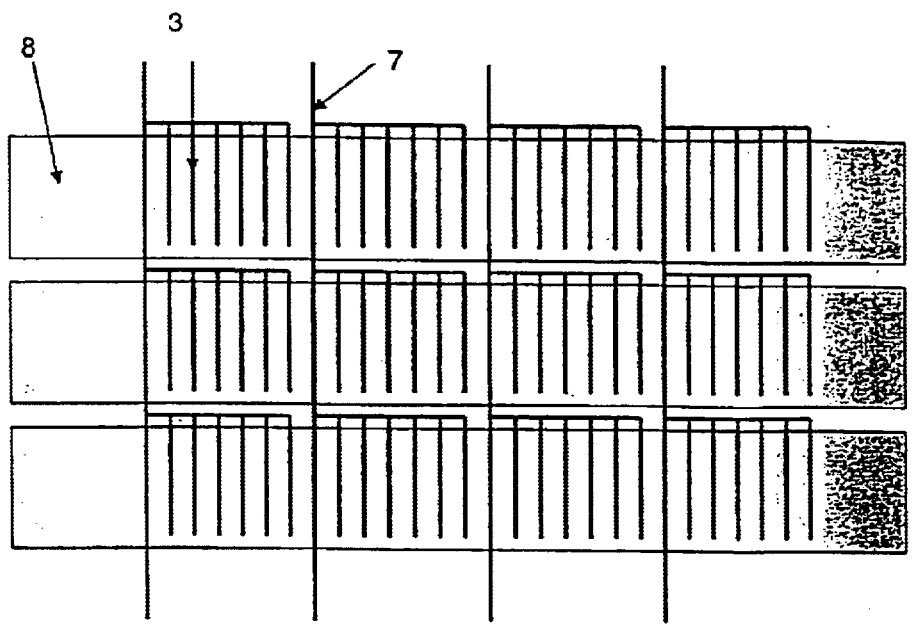
FIG. 3 shows the matrix alignment of top and bottom electrodes.
Figure 4:
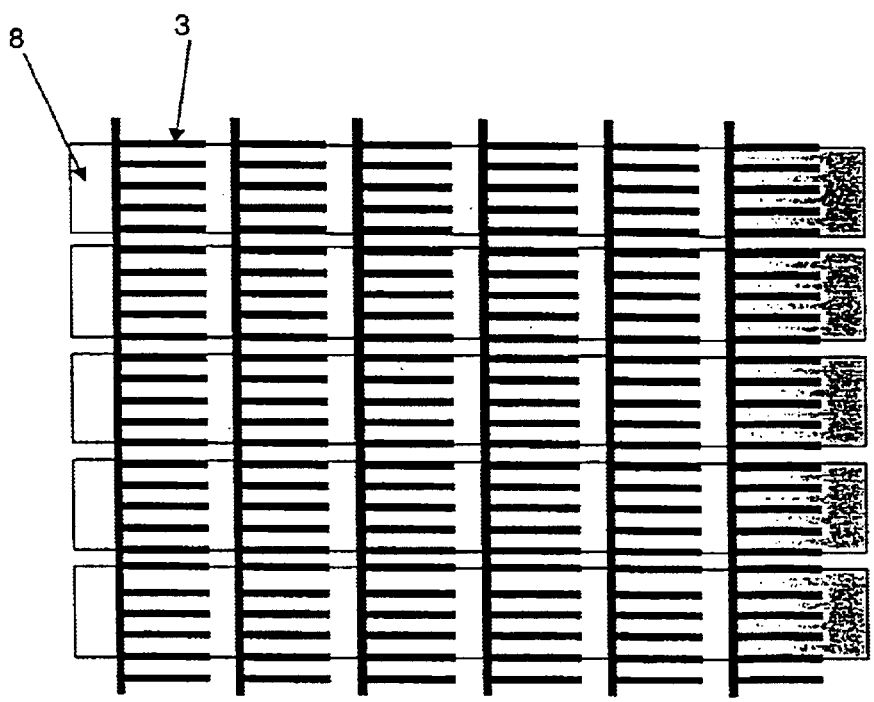
FIG. 4 shows another arrangement for the matrix alignment of top and bottom electrodes.

On the bottom glass 6, there is a layer of continuous ITO 5, followed by a layer of insulator 4. The ITO layer 5 acts as a ground plane. On top of the insulator 4, a comb shaped set of electrodes 3 is deposited. Possible shapes of the comb shaped electrodes are as shown in FIGS. 2, 3 and 4. The comb electrodes are in the form of strips as well for the purpose of passive matrix addressing. The alignment of the comb electrodes 3 and the top ITO electrode 5 is shown in FIG. 2. The particular shapes of the electrodes are needed for switching of the BTN.

On the ITO electrodes 2 and 3, alignment layers of polyimide usually provided to align the liquid crystal molecules are not shown, but such alignment layers will be understood to be present as they are commonly used.

The ITO electrode 2 on the top glass and the comb shaped ITO electrode 3 on the bottom glass can be patterned to form a matrix structure as shown in FIGS. 3 and 4. The top ITO electrode can be patterned into horizontal stripes 8. The comb electrode 3 can be patterned into vertical lines 7. Each cross region is one pixel. Within one pixel, the structure of the bottom electrode consists of lines of the shape shown in FIG. 2.

For a linearly polarized input, there are 2 conditions for the twist angle $\phi$ and retardation $\delta$ of the LC cell where the output will also be linearly polarized. The retardation $\delta$ is defined as $\pi d\Delta n/\lambda$. They are called the LP1 and LP2 modes. For the LP1 mode, the output polarization direction is given by $\phi+\alpha$, where $\alpha$ is the input polarization angle. For the LP2 mode, the output polarization angle is given by $\phi-\alpha$.

$$\text{LP1:}\quad d\Delta n = \lambda\sqrt{N^2 - \left(\frac{\phi}{\pi}\right)^2}$$

where N=1, 2, 3 . . .

$$\text{LP2:}\quad \frac{\phi}{\chi}\tan\chi = \tan 2\alpha$$

where $$\chi = \sqrt{\phi^2 + \delta^2}$$

Therefore, in order for the BTN to be optimized in terms of maximum transmission for one twist state and minimum transmission for the other twist state, the following is required:

(1) The 2 twist states are $\phi$ and $\phi+\pi$.
(2) The retardation of both states is the same.
(3) The input polarizer is oriented at $\alpha$ to the input director.
(4) The $\phi$ twist state corresponds to the LP1 mode.
(5) The $\phi+\pi$ twist state corresponds to the LP2 mode.
(6) The output polarization of the LP1 mode is perpendicular to the output polarization of the LP2 mode.

By considering these rules, solutions for transmissive modes may be obtained. The first five solutions are listed in Table I. The choice of $\gamma$ in Table 1 makes $\phi_1$ state is dark state. The dark and bright states can be interchanged when $\alpha$ or $\gamma$ is changed by 90°.

TABLE I

The optical optimized π-configuration parameters.

| Mode | $\phi_1$ (°) | $\phi_2$ (°) | d$\Delta$n ($\mu$m) | $\alpha$ (°) | $\gamma$ (°) |
|---|---|---|---|---|---|
| #1 | −22.5 | 157.5 | 0.266 | 45 | −67.5 |
| #2 | 22.5 | 202.5 | 0.546 | 45 | 67.5 |
| #3 | 67.5 | 247.5 | 0.799 | 45 | 22.5 |

TABLE I-continued

The optical optimized π-configuration parameters.

| Mode | $\phi_1$ (°) | $\phi_2$ (°) | d$\Delta$n ($\mu$m) | $\alpha$ (°) | $\gamma$ (°) |
|---|---|---|---|---|---|
| #4 | 112.5 | 292.5 | 1.045 | 45 | −22.5 |
| #5 | 157.5 | 337.5 | 1.288 | 45 | −67.5 |

Figure 5:
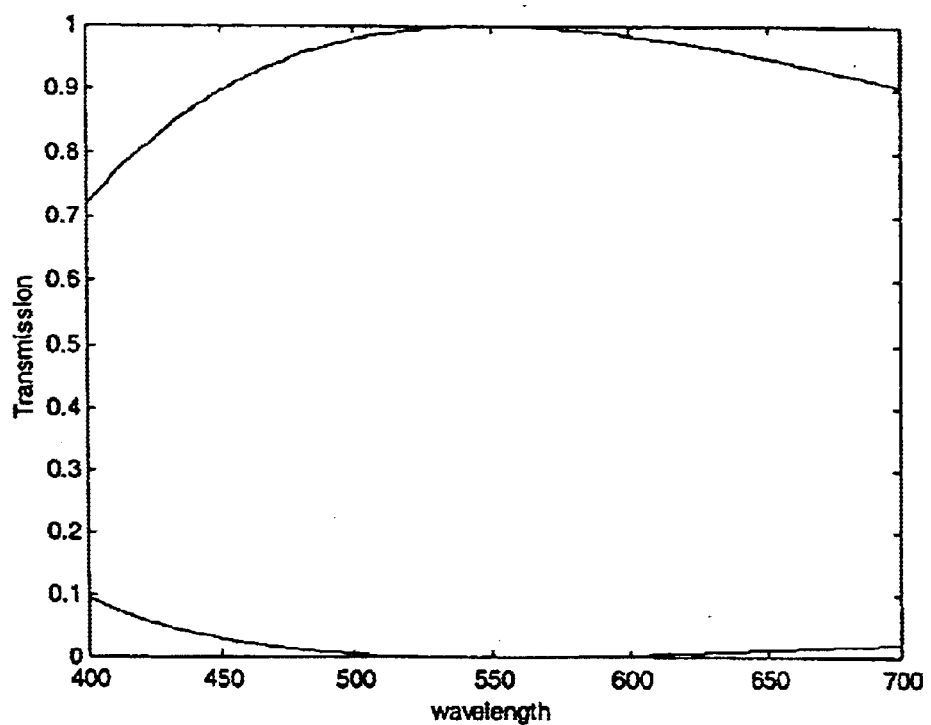
FIG. 5 shows transmission spectra of the on and off states of the first transmittive BTN in Table I.
Figure 6:
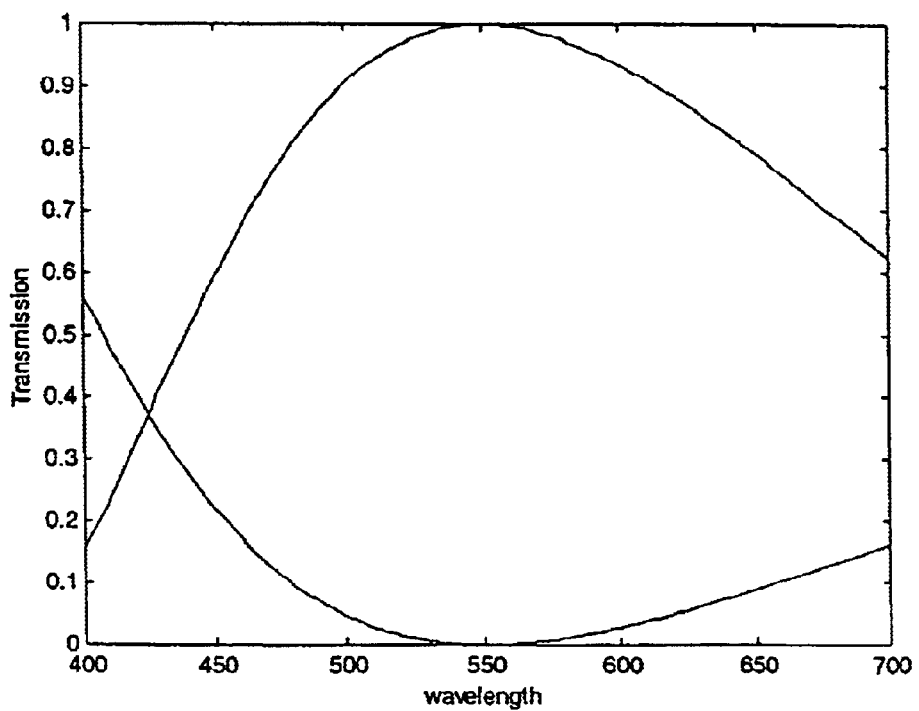
FIG. 6 shows transmission spectra of the on and off states of the second transmittive BTN in Table I.

In this first preferred embodiment, the twist state of the BTN can be in any of the choices listed in Table I. The rubbing condition on the liquid crystal cell should favor the $\phi_1$ twist. FIGS. 5 and 6 show the transmittance spectra of the bright and dark states of this BTN. It can be seen that the No.1 and the No.2 displays can present excellent contrast and brightness. It can also be seen that they are quite non-dispersive over the visible range. As a matter of fact, the No. 1 mode (solid line) has a similar dispersion as ordinary waveguiding Mauguin modes. It is a true black and white display.

Figure 7:
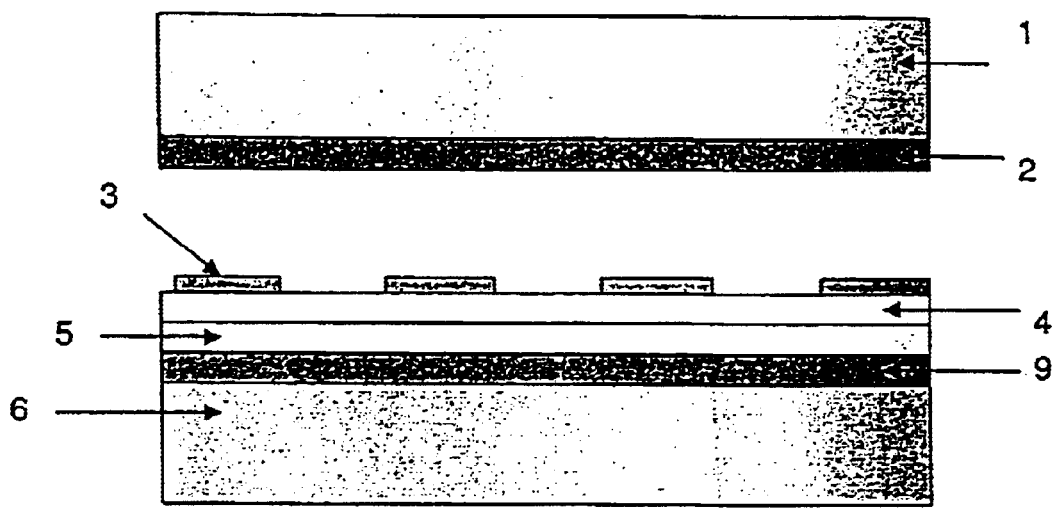
FIG. 7 shows the structure of a reflective BTN according to an embodiment of the invention.

The second preferred embodiment of the present invention is shown in FIG. 7. This is a single polarizer reflective display arrangement. A reflector 9 is place on the bottom glass substrate 6. The ITO layer 5 may or may not be necessary. The comb electrode 3 is placed on top of an insulating layer 4 which is deposited on top of this reflector 9 as shown in FIG. 7. The reflector 9 can be insulating in the present embodiment.

Figure 8:
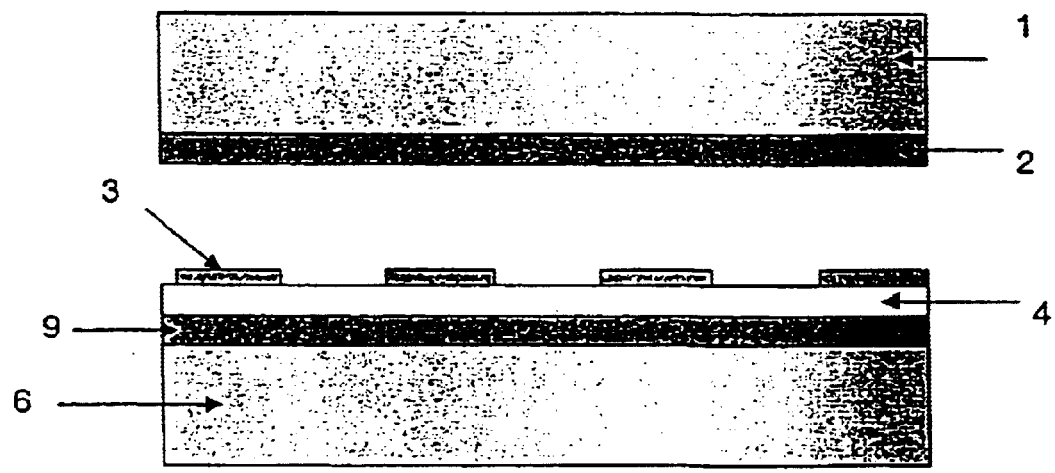
FIG. 8 shows another structure of the reflective BTN.

FIG. 8 shows another preferred embodiment of the single polarizer reflective BTN. In this case, the reflective layer 9 is conducting and thus can act as the ground plane instead of the ITO layer 5. The construction of this BTN is considerably simpler.

In order to optimize the brightness and contrast of the reflective BTN modes, it is necessary that one bistable state should have unity reflectance and the other bistable state should have zero reflectance. In order to obtain the best conditions for the single polarizer reflective BTN, we need to introduce another polarization conversion mode. It is the condition for the LC cell such that a linearly polarized input produces a perfect circularly polarized output. It is called the CP mode. It is given by the following condition:

$$\text{CP:}\quad \frac{\delta}{\chi}\sin\chi = \frac{1}{\sqrt{2}}$$

$$\tan 2\alpha = \frac{-\sqrt{\delta^2 + \phi^2}}{\phi}\cot\sqrt{\delta^2 + \phi^2}$$

Since there is now only a single front polarizer, one of the states should have the reflected polarization parallel to the input polarization direction, while the other state should have an output polarization perpendicular to it. This requires one of the states to be a LP mode and the other state to be a CP mode. It is easy to check that if both twist states are LP modes, the above conditions cannot be met.

In the following, it is assumed that the LP states are to be the bright states while the CP states are to be the dark states. (The dark and bright states can also be interchanged if a polarizing beam splitter is used instead of a front polarizer.) The rules for the optimal optical properies for the reflective case is similar to the transmittive case discussed above, and the output polarization of the two twist states are required to be perpendicular to each other.

Depending on whether the LP1 or LP2 mode is used in the optimization, two groups of solutions with good performance car be obtained. The first four solutions are listed in Table 2 and Table 3 respectively. $\phi_1$ state is bight state.

TABLE II

The first four reflective COP-BTN solutions with LP1-CP.

| No. | Δnd (μm) | $\phi_1$ (°) | $\phi_2$ (°) | α(°) |
|---|---|---|---|---|
| 1 | 0.138 | −174.1 | 5.9 | −41.2 |
| 2 | 0.371 | −132.7 | 47.3 | 33.4 |
| 3 | 0.550 | −5.7 | 174.3 | −13.5 |
| 4 | 0.622 | −297.0 | −117.0 | 27.4 |

TABLE III

The first four reflective COP-BTN solutions with LP2-CP.

| No. | Δnd (pm) | $\phi_1$ (°) | $\phi_2$ (°) | α(°) |
|---|---|---|---|---|
| 1 | 0.268 | −107.7 | 72.3 | 17.2 |
| 2 | 0.383 | −220.4 | −40.4 | −35 |
| 3 | 0.584 | 11.3 | 191.1 | 0.4 |
| 4 | 0.681 | −143.0 | 37.0 | −40.2 |

Figure 9:
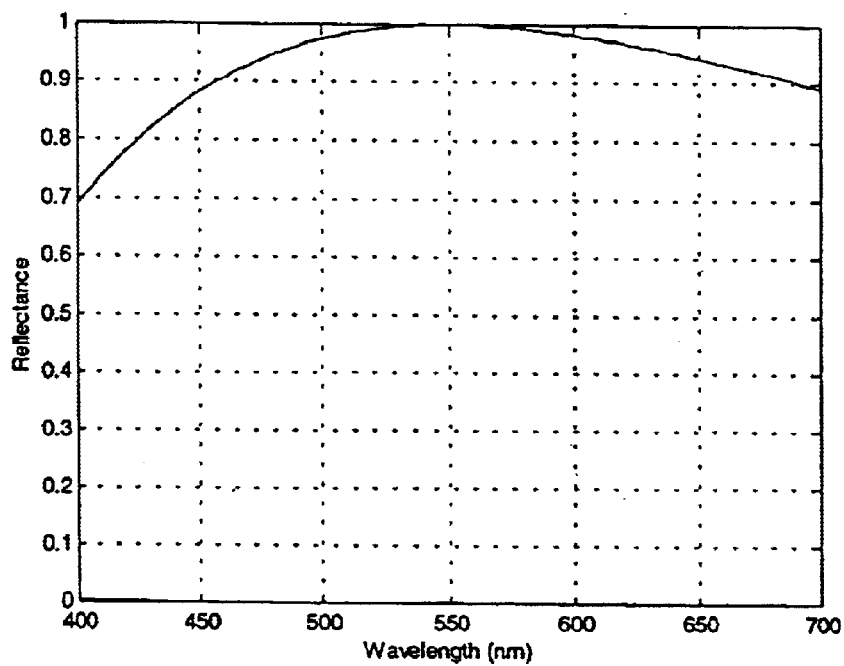
FIG. 9 shows reflection spectra of the on and off states of the first reflective BTN in Table II.
Figure 10:
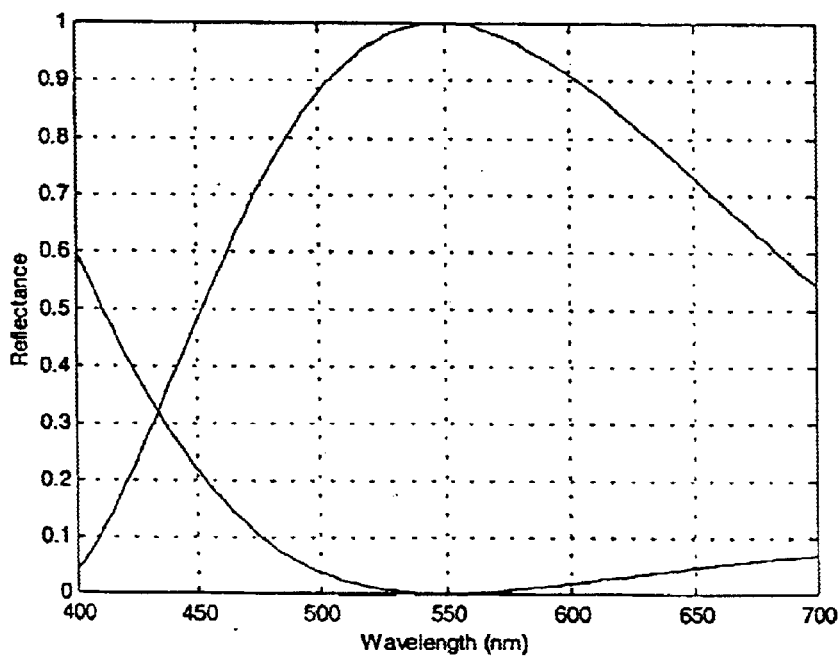
FIG. 10 shows reflection spectra of the on and off states of the second reflective BTN in Table II.
Figure 11:
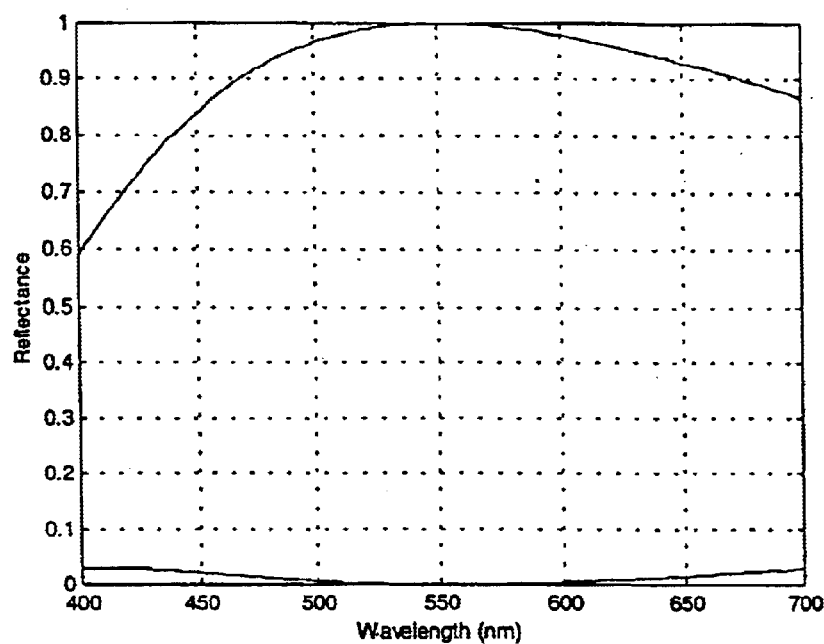
FIG. 11 shows reflection spectra of the on and off states of the first reflective BTN in Table III.
Figure 12:
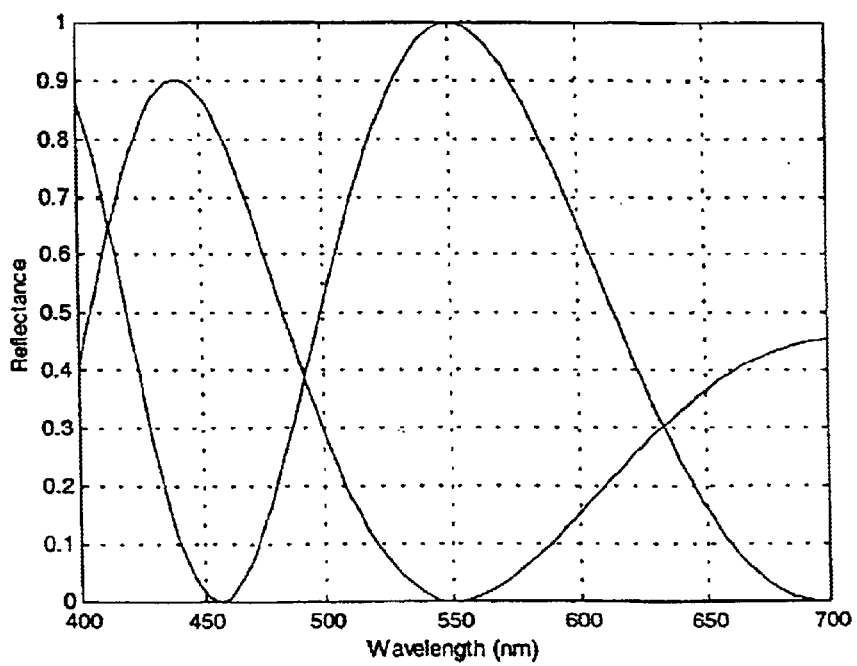
FIG. 12 shows reflection spectra of the on and off states of the fourth reflective BTN in Table III.

FIGS. 9 and 10 show the dispersion properties of the first 2 modes in Table II. FIGS. 11 and 12 show the first mode and the fourth mode in Table III. All of these are excellent optical modes for this reflective BTN.

What is claimed is:

1. A liquid crystal display comprising
   a) liquid crystal cell having top and bottom alignment layers with rubbing directions between them that favor a twist angle of ±22±5° to define a first stable state;
   b) an input polarizer with an angle of ±45±5° relative to the rubbing direction of an adjacent alignment layer and an output polarizer at an angle of ±68±5° relative to said rubbing direction; and
   c) a chiral dopant added to the liquid crystal layer of the liquid crystal cell such that a ratio of a thickness of the liquid crystal layer and a pitch of the liquid crystal twist is between 0.19±0.1 to define a second stable state;
   d) the thickness times birefringence of the liquid cell is 0.27±0.1 μm.

2. A liquid crystal displays as claimed in any of claim 1 further comprising
   a) a transparent conductive electrode on one side of the liquid crystal coil; and
   b) a second transparent conductive electrode structure on the other side of the liquid crystal cell consisting of a conductive ground plane, an insulation layer on top of such ground plane, and a top conductive electrode patterned into a comb shaped structure.

3. A liquid crystal display as claimed in claim 2 wherein said transparent conductive electrodes are formed of indium tin oxide.

4. A liquid crystal display as claimed in claim 2 wherein the comb shaped electrode and the first transparent conductive electrode form a matrix structure with horizontal and vertical lines.

* * * * *